United States Patent [19]
Schiel et al.

[11] Patent Number: 5,535,670
[45] Date of Patent: Jul. 16, 1996

[54] CANTILEVERABLE ROLL FOR ROLL PAIR OF PAPER MAKING MACHINE

[75] Inventors: Christian Schiel, Heidenheim; Joachim Grabscheid, Heuchlingen, both of Germany

[73] Assignee: J. M Voith GmbH, Germany

[21] Appl. No.: 296,243

[22] Filed: Aug. 25, 1994

[30]     Foreign Application Priority Data

Aug. 25, 1993 [DE] Germany ............... 43 28 505.8

[51] Int. Cl.$^6$ .................. B30B 3/04; D21G 9/00
[52] U.S. Cl. ............ 100/153; 100/155 R; 100/168; 162/273; 162/358.3; 492/15; 492/20
[58] Field of Search .............. 100/153, 155 R, 100/168; 162/272, 273, 358.3; 492/7, 15, 20

[56]     References Cited

U.S. PATENT DOCUMENTS

| | | | |
|---|---|---|---|
| 1,700,301 | 1/1929 | Aldrich et al. | 162/273 |
| 4,140,575 | 2/1979 | Wenzl | 162/273 |
| 4,861,431 | 8/1989 | Törmänen | 162/273 |
| 5,207,872 | 5/1993 | Jansson | 162/272 |
| 5,399,242 | 3/1995 | Schiel | 162/273 |
| 5,400,708 | 3/1995 | Meschenmoser | 100/153 |

FOREIGN PATENT DOCUMENTS

| | | | |
|---|---|---|---|
| 9207995 U | 8/1992 | Germany. | |
| 658960 | 10/1951 | United Kingdom | 162/273 |

*Primary Examiner*—Stephen F. Gerrity
*Attorney, Agent, or Firm*—Ostrolenk, Faber, Gerb & Soffen

[57]     ABSTRACT

A cantileverable roll for use in a roll press, wherein the cantileverable roll cooperates with a backing roll. The cantileverable roll has a rotating surface and is either a solid rotatable roll body or a stationary roll body with a rotatable shell around it. A journal at each end of the cantileverable roll is supported in a respective bearing bracket. At one end of the roll, preferably the drive end, there is a non-rotating extension piece which extends out axially from the roll body and is fastened to the bearing bracket at that end. A tension bar or the like connects the extension piece to a stationary structural part and introduces force in the roll body which compensates for the weight of the roll when the other end of the roll is temporarily unsupported and the roll is cantilevered. The backing roll may also be cantilevered. The various techniques for supporting the one end of the roll by using the coupling element from the extension piece to the frame of the paper making machine are disclosed. The cantileverable roll and the roll press are particularly useful in a paper making machine.

29 Claims, 9 Drawing Sheets

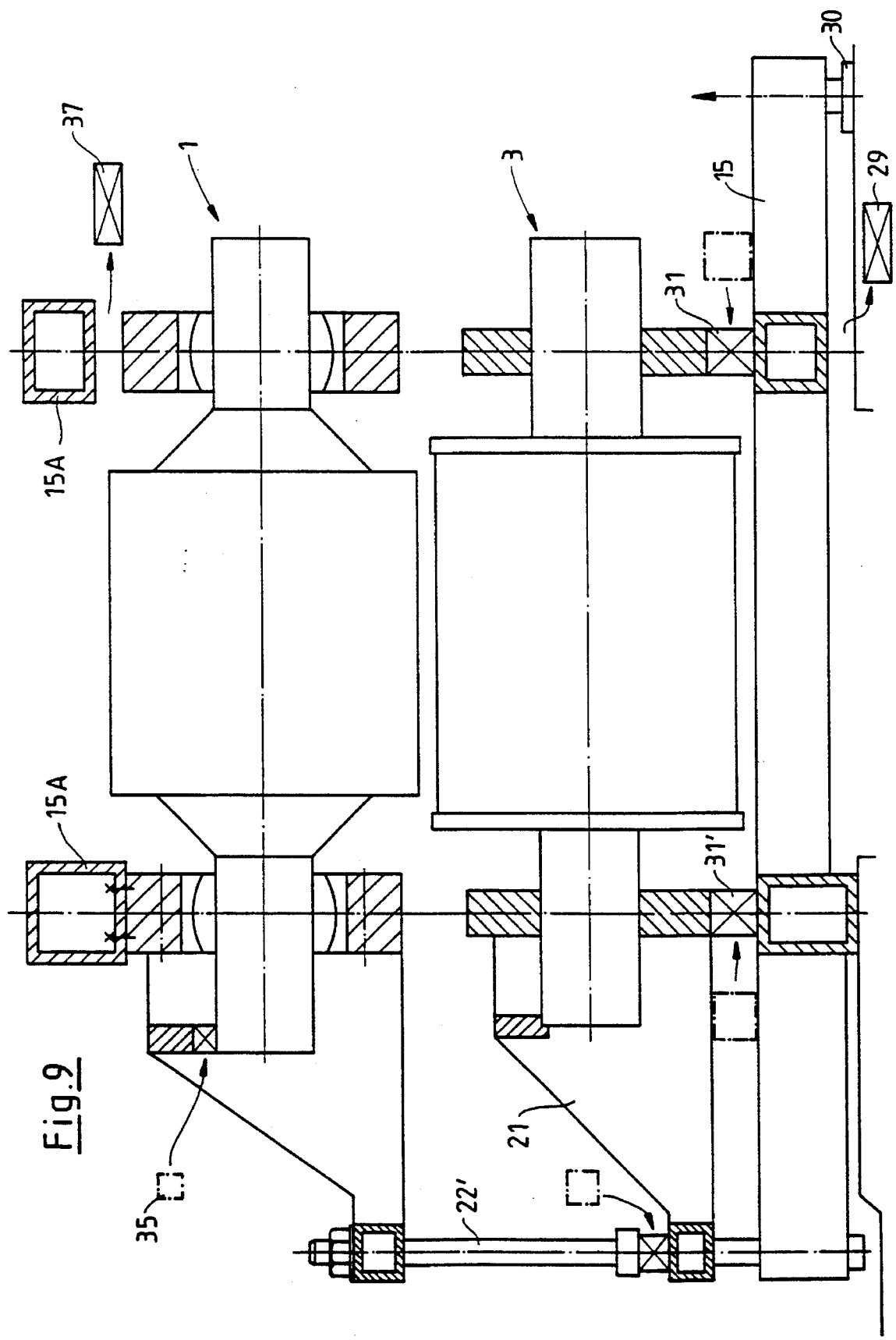

CANTILEVERABLE ROLL FOR ROLL PAIR OF PAPER MAKING MACHINE

BACKGROUND OF THE INVENTION

The present invention relates to a cantileverable roll, particularly for use in paper manufacturing machines. Such a roll either has a rotatable roll body which is supported, for instance, by antifriction bearings in bearing brackets, or it has a non-rotatable roll body which is also supported in bearing brackets and on which a rotatable roll shell is mounted. In the latter case, the roll shell can, for instance, be developed as a metallic roll tube and can be supported on the non-rotatable roll body inside the shell by means of a hydraulic supporting device, as in a sag adjustment roll. On the other hand, the rotatable roll shell can comprise a sleeve, i.e. it can be formed of a relatively thin and flexible material, which travels over a press shoe, and the shoe is displaceable in the radial direction relative to the non-rotatable roll body. This is described as a long-nip press roll.

A cantileverable roll having a rotatable roll body is known from U.S. Pat. No. 1,700,301. A cantileverable roll having a non-rotatable roll body is known from German Utility Model 92 07 995. In both of these known arrangements, a device is provided on one end, and particularly the drive end, of the roll for introducing into the roll body a pair of opposing forces which compensate for the weight of the roll. This permits "cantilever" of the roll. Particularly when the machine is at a standstill, the other operator end of the roll can be detached from the frame, foundation, or the like and the entire weight of the roll is introduced only over the drive end of the roll into the frame, foundation, or the like. This makes it possible, for instance, to introduce an endless paper machine wire or felt into the machine along the direction parallel to the axis of the roll. Here, it is assumed that, during operation, the roll extends through the inside of the loop of the wire or felt. By cantilevering a roll having a non-rotatable roll body, it is also possible to install or remove the roll shell, again in the direction of the longitudinal axis of the roll, without having to support the supporting body on the operator end.

SUMMARY OF THE INVENTION

The object of the invention is to improve the above described known constructions. Among other things, another object is that the force which acts on the machine frame or foundation upon the cantilevering be as small as possible.

This object is achieved by the features described. A cantileverable roll for use in a roll press, wherein the cantileverable roll cooperates with a backing roll. The cantileverable roll has a rotating surface and is either a solid rotatable roll body or a stationary roll body with a rotatable shell around it. A journal at each end of the cantileverable roll is supported in a respective bearing bracket. At one end of the roll, preferably the drive end, there is a non-rotating extension piece which extends out axially from the roll body and is fastened to the bearing bracket at that end. A tension bar or the like connects the extension piece to a stationary structural part and introduces force in the roll body which compensates for the weight of the roll when the other end of the roll is temporarily unsupported and the roll is cantilevered. The backing roll may also be cantilevered. The various techniques for supporting the one end of the roll by using the coupling element from the extension piece to the frame of the paper making machine are disclosed. The cantileverable roll and the roll press are particularly useful in a paper making machine.

The simplest embodiment of the invention involves a non-rotatable roll body having a rotating shell around the body. It is possible to connect a non-rotating extension piece, which is separate from the roll body, directly to the roll body, for instance, by means of a flange connection or by telescopic insertion. Another possibility is to connect a non-rotating extension piece which is separate from the roll body to the drive side bearing bracket. In these cases it is possible to select the length of the extension piece so that the opposing force to be introduced into the frame or building can be kept relatively small and so that expensive reinforcements of the building are unnecessary. It is furthermore unnecessary to lengthen the roll body itself in a corresponding manner beyond the drive-side bearing bracket. Such lengthening would present other difficulties, particularly when the length of the roll body is already considerable without such lengthening. In modern paper manufacturing machines, the distance from the operator-side to the drive-side bearing bracket can be up to 10 meters.

In order to facilitate the introduction of the one or the pair of opposing forces from the extension piece into the roll body, the drive end of the roll body is allowed to extend beyond the bearing bracket by a relatively small amount. A point of attack is provided there at which the extension piece can introduce at least one opposing force into the roll body. If the roll body is non-rotatable, the extension piece can then be continuously in contact with the point of attack. On the other hand, if the roll body is rotatable, then a certain distance between the drive side of the roll and the extension piece will always be present in normal operation. This distance can be bridged over for the cantilevering by, for instance, providing an intermediate piece. In the cantilevered condition, the extension piece, together with the drive side bearing bracket, forms a device which acts like a slip-on tube on the roll body in order to hold it suspended.

In an important further concept of the invention, a frame is provided having at least one longitudinal beam which extends beyond the drive side bearing bracket. It is obvious that this frame will be fastened in the region of the two bearing brackets to the operator side and drive side foundations. The presence of such a frame makes it possible to connect the extension piece (for instance, by means of a vertically extending tension bar) not to the foundation but to the frame. Thus, no substantial opposing force for the cantilevering is any longer introduced into the foundation.

The invention can be employed not only for a single roll but also in a roll press which has, for instance, two rolls. In that case, it is possible for only one of the two rolls to be developed as a cantileverable roll in accordance with the invention, for example, if only in this roll extends through an endless felt loop in operation. However,it is also possible to develop both rolls as cantileverable rolls.

Other features and advantages of the present invention will become apparent from the following description of the invention which refers to the accompanying drawings.

BRIEF DESCRIPTION OF THE DRAWINGS

FIGS. 8 and 9 show another possible modification of the embodiment shown in FIGS. 4 and 5.

DESCRIPTION OF PREFERRED EMBODIMENTS OF THE INVENTION

Figure 1:
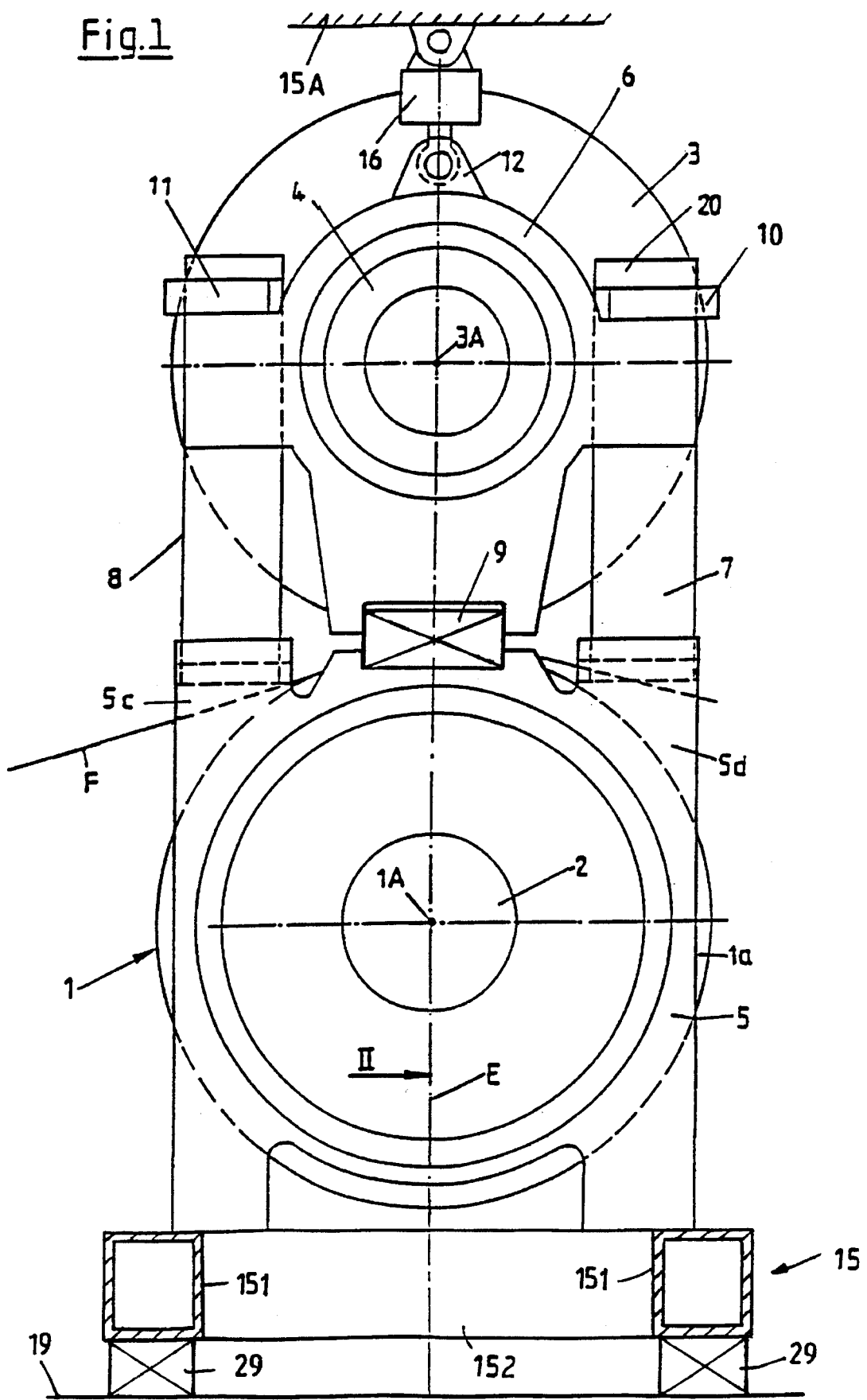
FIG. 1 schematically shows a two-roll press seen from the operator side.
Figure 2:
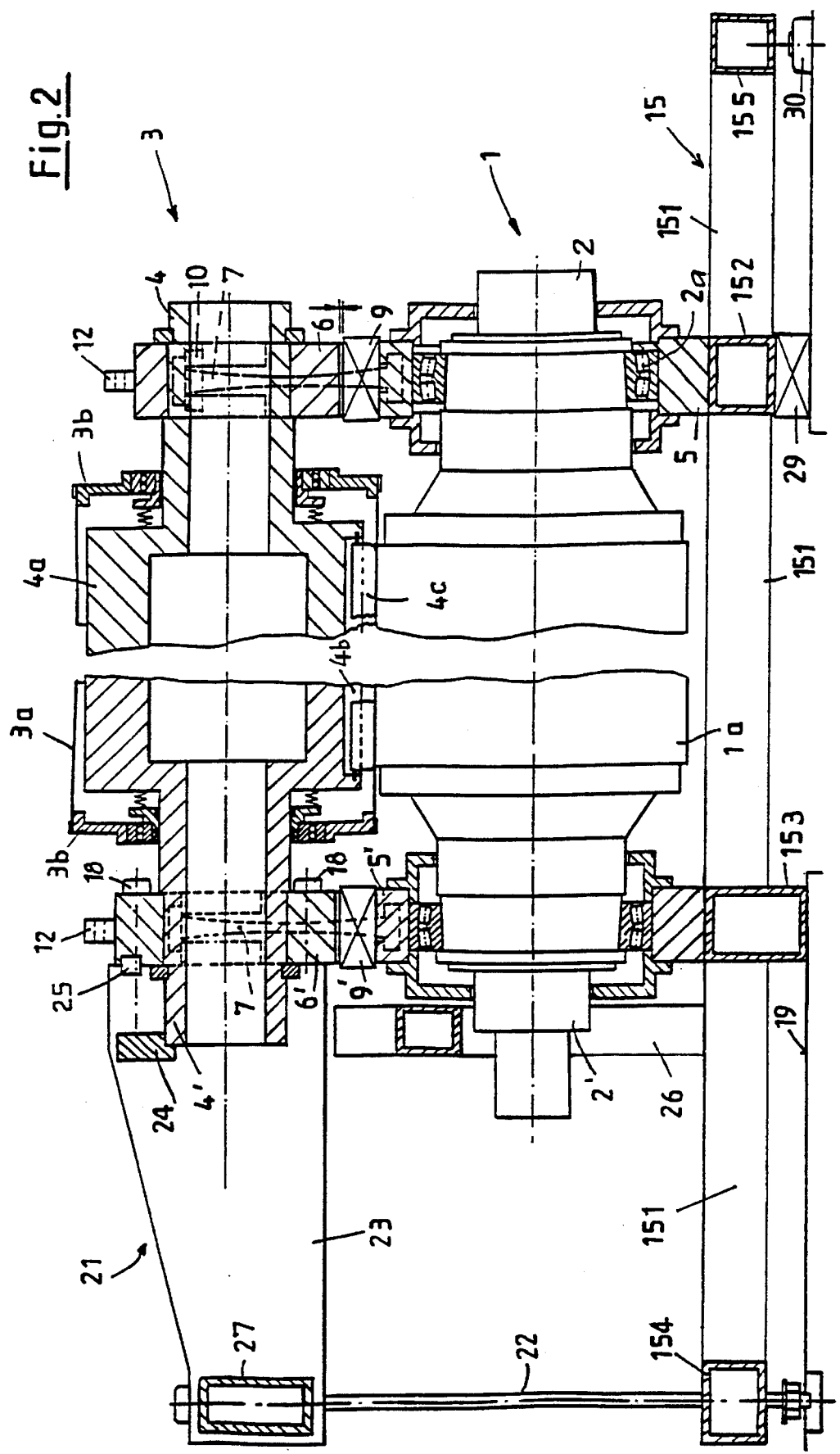
FIG. 2 is a longitudinal sectional view along the line II of FIG. 1, shown on a smaller scale.
Figure 3:
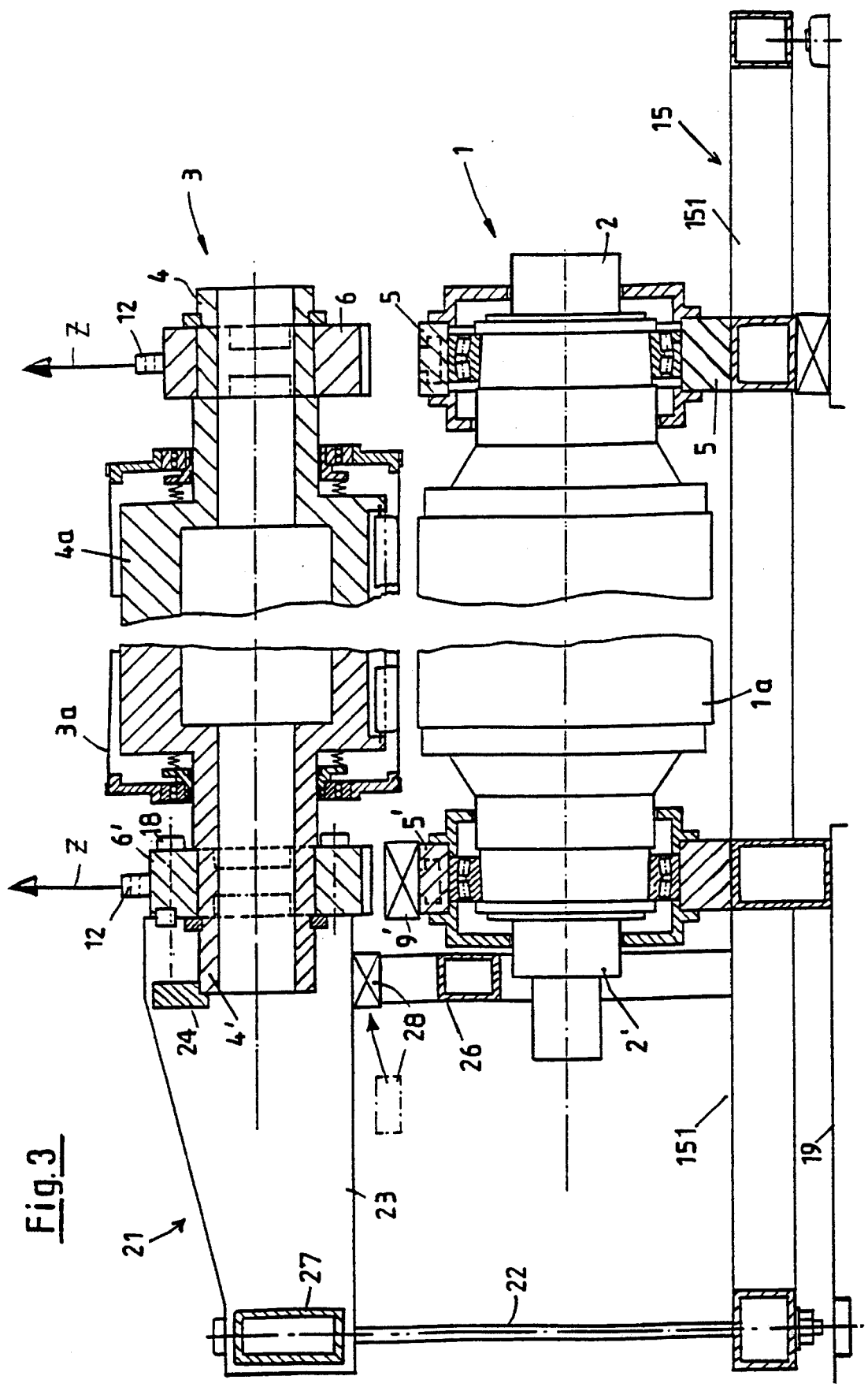
FIG. 3 is a view corresponding to FIG. 2, but showing the cantilevering of the upper roll.

The roll press embodiment shown in FIGS. 1 to 3, has an upper cantileverable roll 3 and a lower, non-cantileverable backing roll 1. The axes 1A, 3A of these rolls lie parallel in a press plane E. Differing from FIG. 1, the press plane in which the axes lie could also be inclined to the vertical. The lower backing roll 1 has a rotatable hollow roll shell 1a with journals 2, 2' which are fastened to its ends. Each journal rests via an antifriction bearing 2a in an operator side bearing bracket 5 and in a drive side bearing bracket 5', respectively. The bearing brackets 5, 5' stand on a frame 15 which rests on a foundation 19 located in the regions of both bearing brackets.

The upper cantileverable roll 3 is a so-called long nip press roll. Its roll shell 3a is a sleeve shaped flexible press shell which is fastened on two rotatable shell supporting disks 3b at its opposite ends. Each shell supporting disk rests on a respective, stationary journal 4, 4' of a non-rotatable roll body 4a which extends through the inside of the roll shell 3a. Opposite the backing roll 1 and therefore also in the press plane, the roll body 4a is provided with a recess 4b having a piston-like, hydraulically actuatable press shoe 4c contained therein. The concave slide surface of the shoe presses the press shell 3a against the backing roll 1 in order thereby to form a press nip which is lengthened in the direction of travel by the shoe. A web of paper from which the water is to be removed travels through the press nip together with at least one endless felt belt F.

The upper roll 3 rests at each roll end by each of the journals 4, 4' also in bearing brackets 6 and 6' respectively. Between each pair of bearing brackets 5 and 6 and 5' and 6', respectively there is a removable block shaped guide piece 9 and 9', respectively. The bearing brackets 6, 6' of the upper roll 3 rest upon the pieces 9 and 9' when the roll press is in its unloaded condition, i.e., when the recess 4b is not under pressure. However, it is the loaded condition, in which the press shoe 4c exerts a pressing force on the backing roll 1, that is shown in FIG. 2. The reaction forces resulting therefrom are transmitted by means of flexurally soft tension bars 7 and 8 from the upper bearing brackets 6, 6' to the lower bearing brackets 5, 5'. The upper bearing brackets 6, 6' are uplifted in this condition from the guide piece 9, 9' by the distance p.

In FIG. 1, a flexurally soft tension bar 7, 8 is provided on each lateral side of the pressing plane E. These tension bars as well as U-shaped intermediate pieces 10, 11 are inserted from the side into recesses in the bearing brackets 5 and 6.

The lower bearing bracket 5 has arms 5c and 5d in which T-grooves are present. Each flexurally soft tension bar 7, 8 has a hammer head 20 on each end and is preferably developed in the manner of a Belleville spring, the "leaf plane" of which is perpendicular to the pressing plane E. In this way, the tension bars 7, 8 can be deformed when the roll body 4, 4a, 4' of the upper roll 3 experiences a change in length, caused, for instance, by heat, and/or when it bends under the pressing force. As a result, the upper bearing brackets 6, 6' can be connected rigidly, i.e. in non-tiltable manner, to the journals 4, 4'. The axial slide surfaces which were required in older constructions between these two parts as well as a spherical bushing are unnecessary.

For receiving the guide pieces 9, 9', a recess shown in FIG. 1 is provided in the lower bearing brackets 5, 5'. That recess has side surfaces which are parallel to the pressing plane E. A correspondingly placed recess which also has side surfaces parallel to the pressing plane is also provided in the upper bearing brackets 6, 6'.

In order to be able to replace the press shell 3a of the upper long nip press roll 3 and/or for insertion of a new endless felt F, the roll 3 is cantileverable. For this purpose, an extension piece 21 is fastened to the outside of the drive side bearing bracket 6', for instance, by means of screws 18. The extension piece 21 extends substantially parallel to the axis of the roll body 4, 4' and thus forms an extension of it. The extension piece 21 is comprised of two longitudinal arms 23 which are disposed on both sides of the journal 4' and which are connected to each other at their outer ends by a cross beam 27. The journal 4' is itself also extended beyond the bearing bracket 6', but only by about 1.5 to 4 times the width, i.e. the axial length, of the bearing bracket 6'. A crossbar 24, which is connected to the two longitudinal arms 23, acts from above on the outermost end of the extended journal 4'.

The frame 15 is comprised of one or preferably two longitudinal beams 151 and, in the region of the bearing brackets 5, 5', cross beams 152 and 153, respectively, which are fastened in the customary manner to foundation rails. The longitudinal beams 151 are extended beyond the drive side cross beam 153 outward into the axial region of the cross beam 27. The beams 151 are connected there also by means of a cross beam 154. Finally, one or two vertical tension bars 22 are present which connect the two cross beams 27 and 154. This attachment is initially merely a loose one, namely as long as the roll 3 rests on the bearing bracket 5, 5' of the roll 1 or during the condition of operation shown in FIG. 2.

In order to cantilever the upper roll 1, one proceeds as follows. After initial removal of the tension bars 7, 8, the roll 3 is lifted (arrow Z in FIG. 3). See also in FIG. 1, the lifting lugs 12, lifting cylinder 16 and top frame part 15a which cooperate to lift the roll. An intermediate piece 28 is then inserted between the extension piece 21 and an additional stand 26 which is arranged, standing on the frame 15, near the outside of the bearing bracket 5' of the backing roll 1. The lift cylinder 16 can now be relieved and disconnected. Accordingly, the upper roll 3 now hangs freely above the backing roll 1, held only by the extension piece 21, the tension bars 22 which are now stressed in tension and the additional stand 26. If necessary, the backing roll 1 below can now be removed, after removal of the intermediate piece 9'. In principle, if one can dispense with the possibility of removing and reinstalling the backing roll 1, an additional or enlarged intermediate piece can be inserted, differing from that in FIG. 3, between the bearing brackets 5' and 6' in order to cantilever the upper roll 3. The additional stand 26 can then be dispensed with. It can be noted from FIG. 3 that the extension piece 21, together with the bearing bracket 6', is able, in accordance with the principle of a "slip-on tube", to hold the upper roll 3 suspended without any support on its operator side end.

If the roll press shown in FIGS. 1–3 has an endless lower felt, the following known procedure is followed to introduce it. The frame 15 rests in the region of the operator side bearing bracket 5 on removable intermediate pieces 29. The longitudinal beams 151 are extended beyond the cross beam 152 up to a cross beam 155 on which the hydraulic pressure cylinder can act from below. First, the lower felt is pulled in from the right to the left up to the cross beam 152 over the longitudinal beams 151. Then the frame 15 is lifted slightly by the pressure cylinder 30 until the intermediate piece 29 can be removed (FIG. 9). The lower felt can now be pulled completely into the roll press and the frame 15 can again be placed on the intermediate piece 29.

Figure 4:
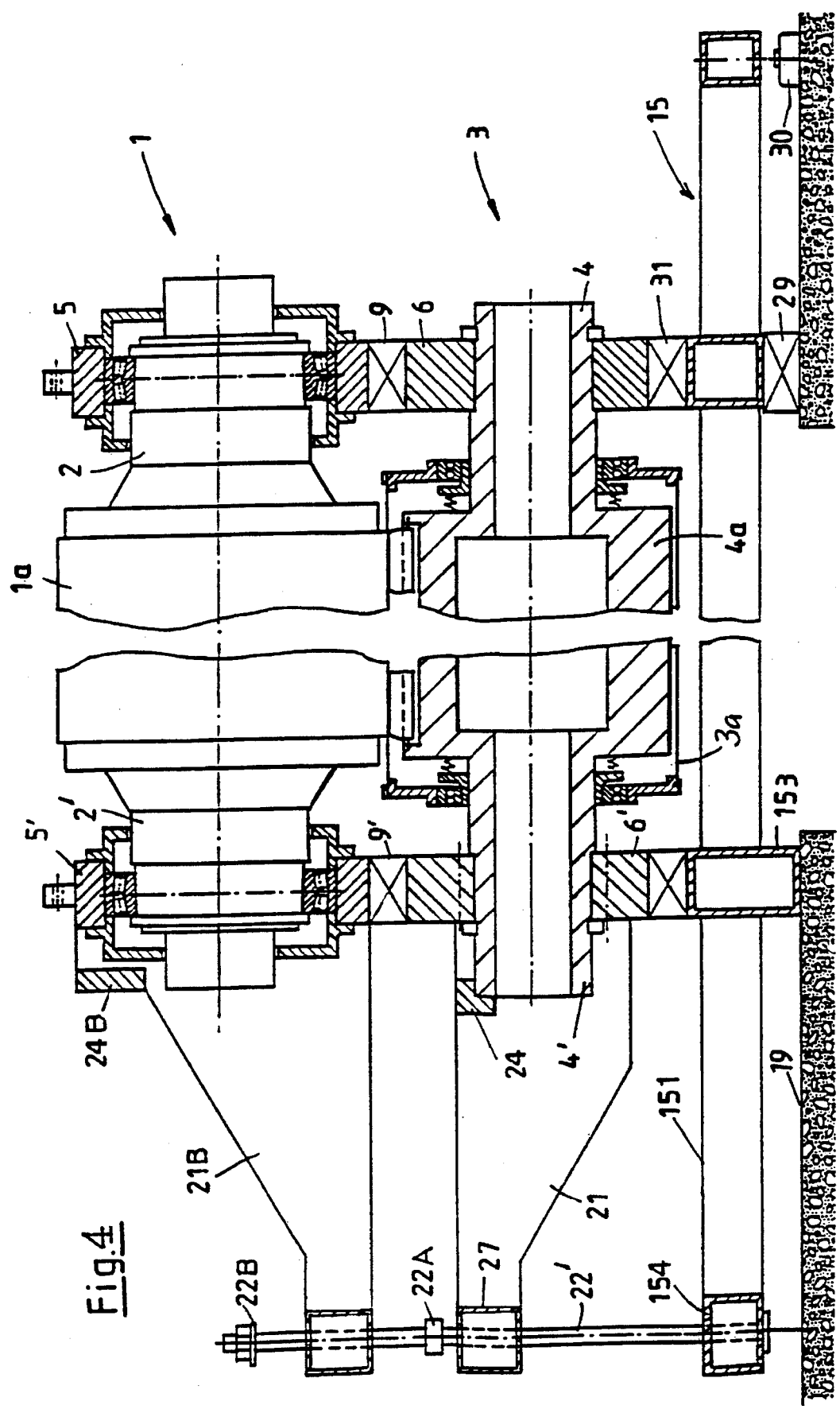
FIGS. 4 and 5 are views similar to FIGS. 2 and 3, showing both rolls cantileverable.
Figure 5:
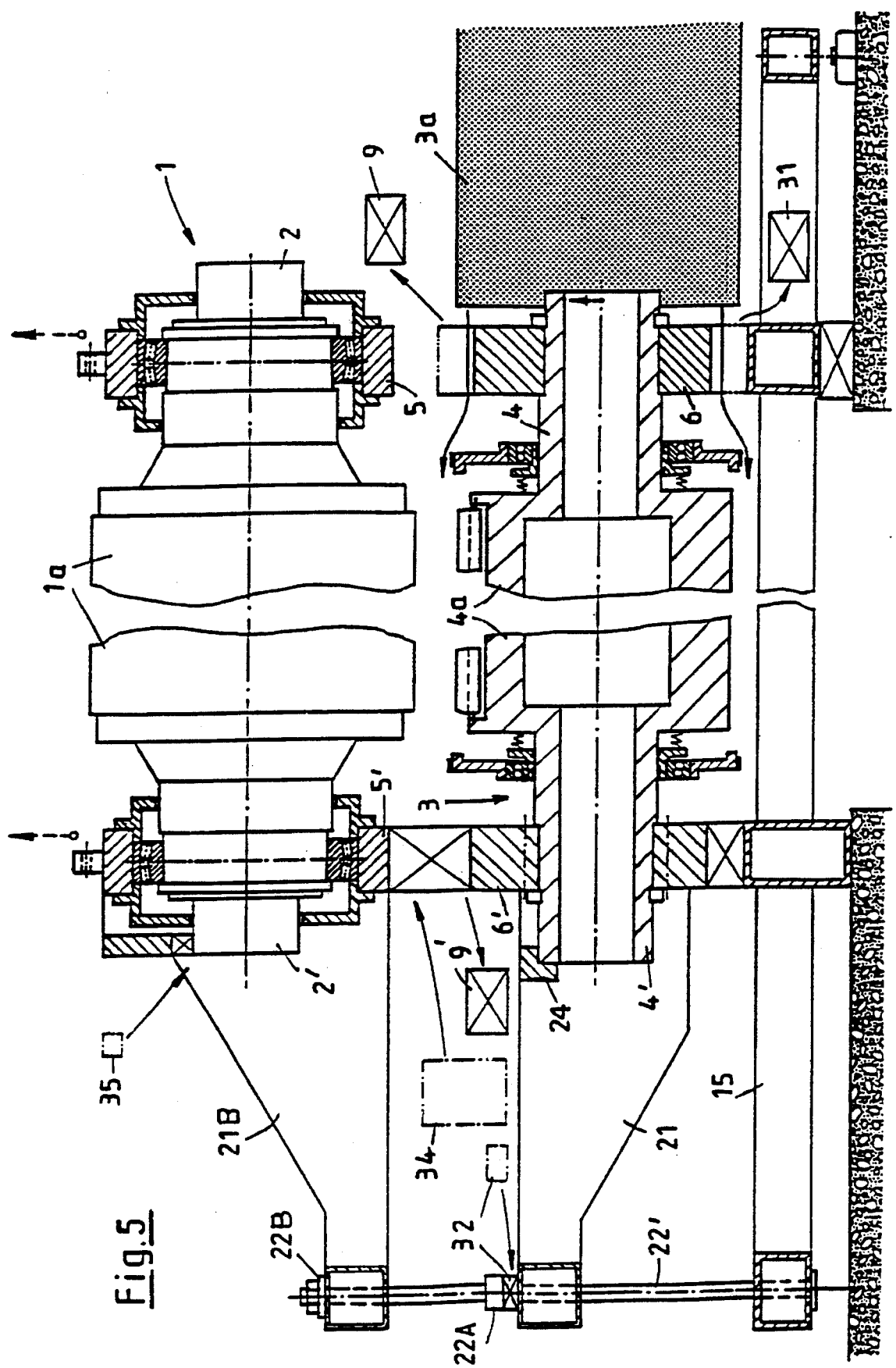
Figure 6:
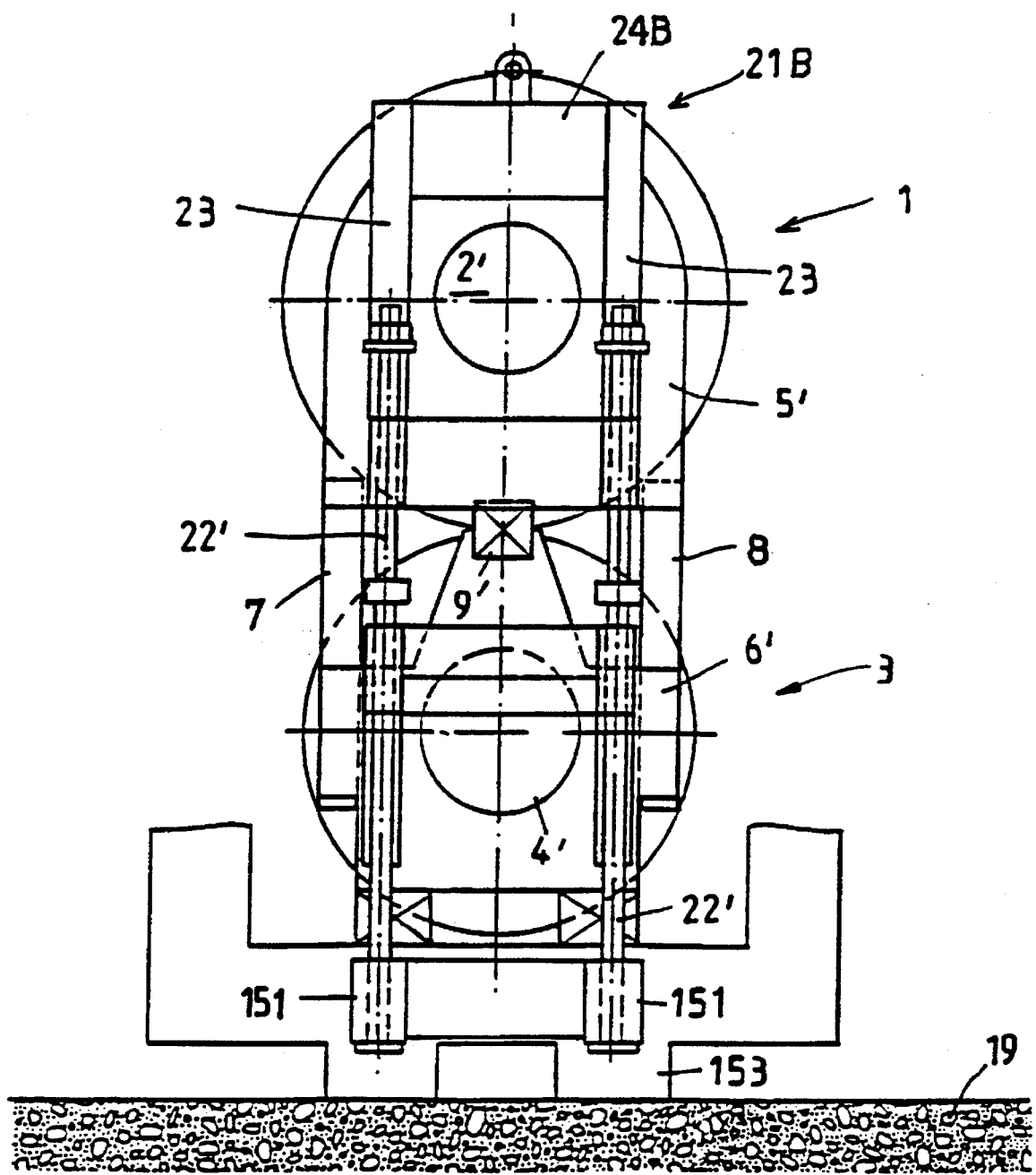
FIG. 6 is a view of the roll press of FIG. 7 as seen from the drive side.

In FIGS. 4 to 6, the long nip press roll 3 is now the bottom roll. In principle, it is cantileverable in exactly the same manner as described for the embodiment of FIGS. 2 and 3. The parts necessary for this are provided with the same reference numerals in FIGS. 4 and 5 as in FIGS. 2 and 3. In addition, there is merely a removable intermediate piece 31 between the operator side bearing bracket 6 and the frame 15. The additional stand 26 of FIG. 2 is dispensed with. Since the upper, backing roll 1 is also cantileverable, the tension bars 22' are fixed in the frame 15. Furthermore, each rod 22' is provided, above the cross beam 27 of the extension piece 21 of the roll 3, with a collar 22A at a certain distance above the cross beam 27. For cantilevering the lower roll, an intermediate piece 32 is inserted beneath the collar 22A. The operator side end of both rolls 1 and 3 are lifted and the intermediate piece is removed. The backing roll 1 them remains raised and the intermediate piece 9 is removed. Thus, a new press shell 3a can be mounted, in accordance with FIG. 5.

For cantilevering the upper, backing roll 1, the latter is raised until the extension piece 21B comes into contact with the upper stop 22B of the tension bars 22'. Then the intermediate piece 9', which was present between the drive side bearing brackets 5' and 6', is replaced with a larger intermediate piece 34. Furthermore, an additional intermediate piece 35 is inserted between the drive side journal 2' which rotates in operation, and the crossbar 24B of the extension piece 21B.

Figure 7:
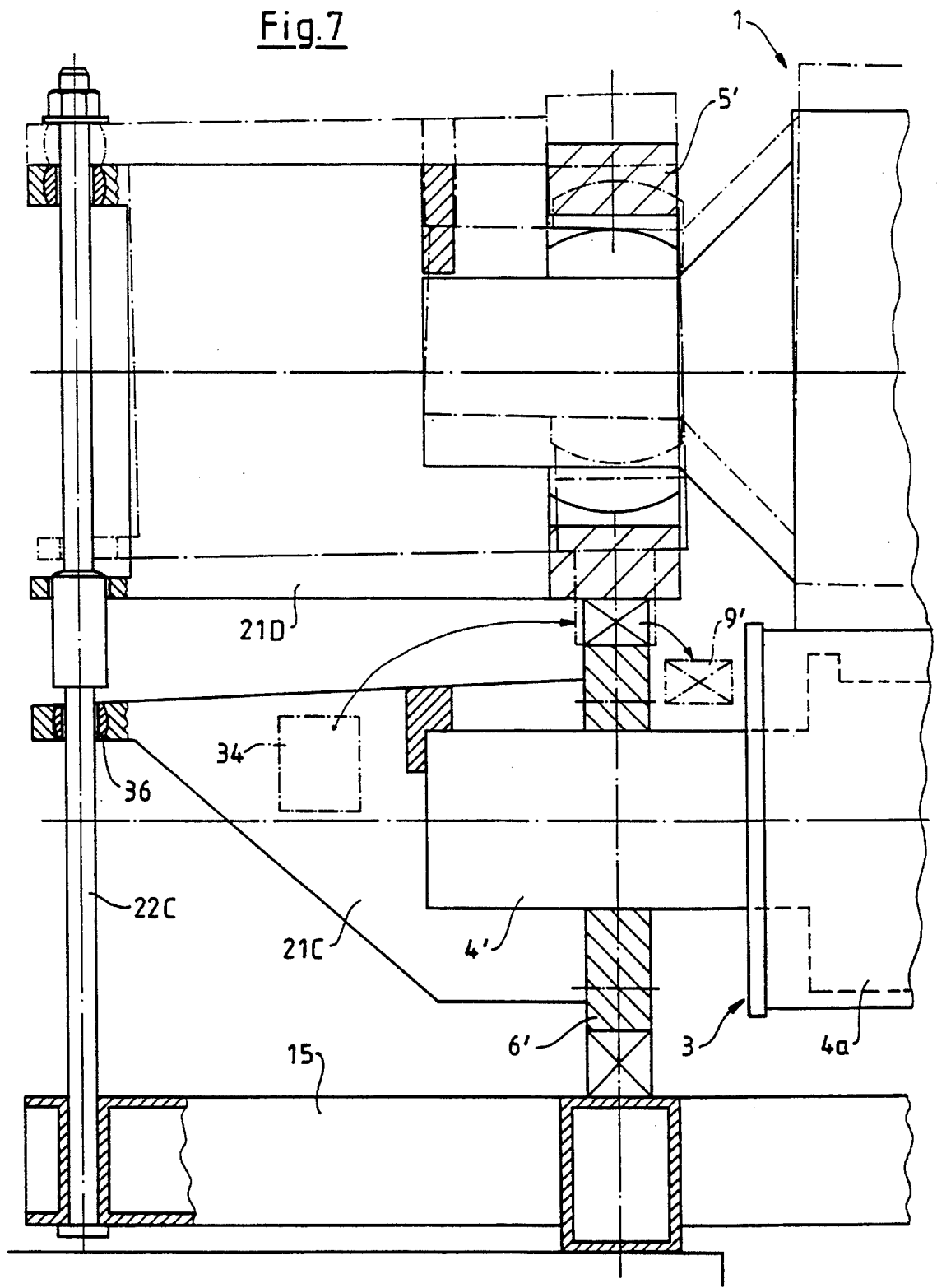
FIG. 7 shows a modified embodiment as compared with FIG. 4.

FIG. 7 shows possibilities for further development of the arrangement according to FIGS. 4 and 5. The tension bars 22C are firmly clamped in the frame 15 and, in addition, are held precisely, for instance, in the vertical direction, by extension piece 21C of the bottom roll 3. A spherical bearing bushing 36 in the extension piece 21C around the bar 22C takes into consideration the fact that the roll body 4a of the roll 3 sags in operation, whereby the journal 4', together with the bearing bracket 6' and the extension piece 21C, incline slightly. The upper regions of the tension bars 22C serve now in addition for fixing the position of the drive side bearing bracket 5' of the backing roll 1 so that the extension piece 21B is guided on two or four places by at least one of the tension bars 22C.

Figure 8:
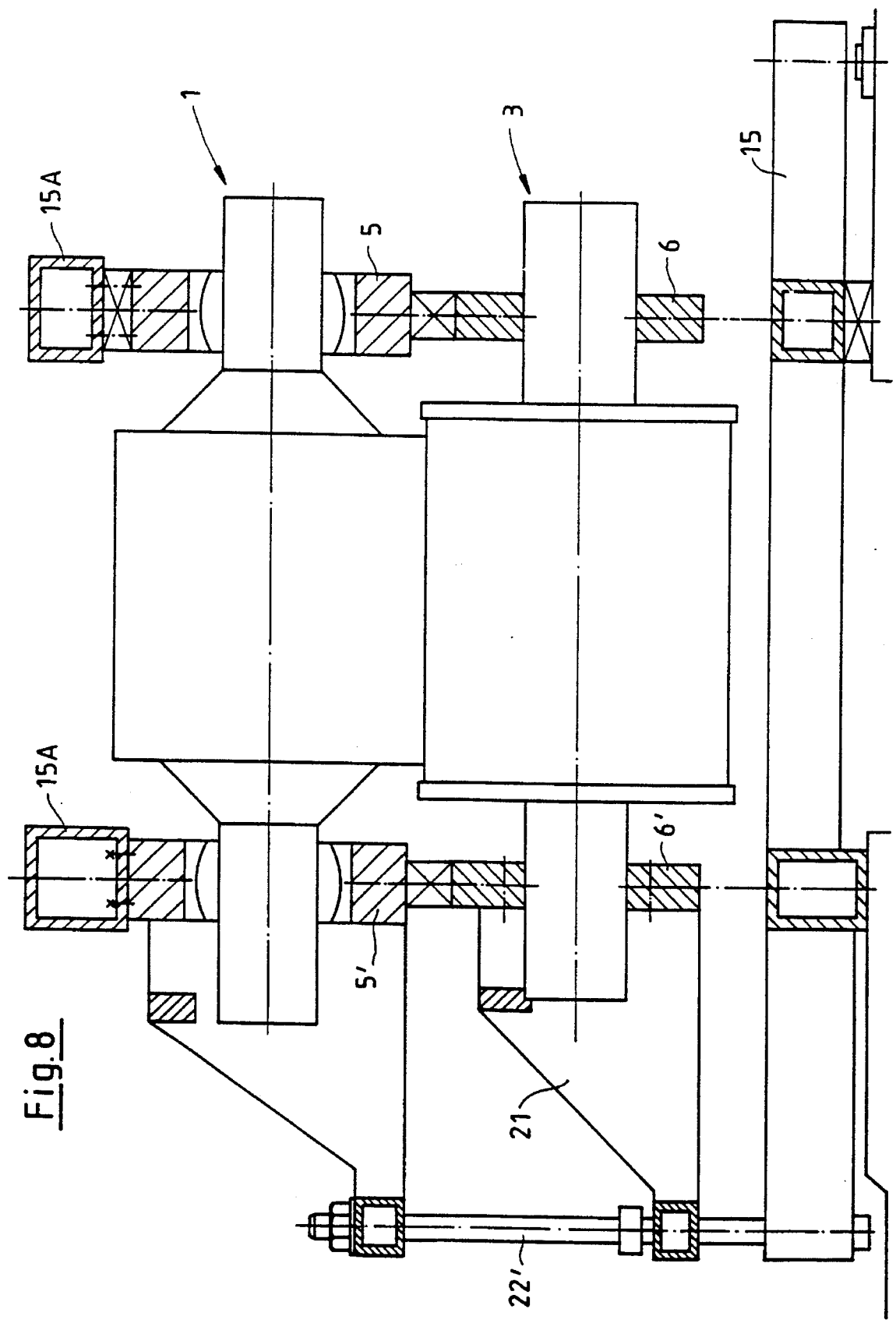

Finally, FIGS. 8 and 9 show that the cantilevering of the backing roll 1 and/or the long nip press roll 3 in accordance with the invention is also possible when they hang, i.e. are suspended in operation (FIG. 8), from the top frame parts 15A. The lower roll 3 hangs by means of the tension bars 7, 8, 7', 8' of FIGS. 1 and 6, not shown, from the bearing brackets 5 and 5' of the roll 1. For cantilevering the upper backing roll 1, the roll 3 is placed down on the frame 15, so that the bearing brackets 6, 6' rest on intermediate pieces 31, 31'. Then, by means of a hoist, the operator end of the roll 1 is lowered somewhat in order to enable removal of the intermediate piece 37. That roll end is then lifted again in order to enable insertion of the intermediate piece 35. The cantilevering of the roll 3 can then be carried out in the same manner as in FIG. 5.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cantileverable roll for a paper making machine, the roll comprising:

the roll including a roll body with opposite ends, and means which is rotatable around the axis of the roll; a journal at each end of the roll body; a bearing bracket in the machine for each of the roll end journals;

a force opposing device at one end of the roll for introducing a force to compensate for the weight of the roll, the device including:

a non-rotating extension piece separate from the roll and extending axially out from the one end of the roll, the extension piece being connected with the roll;

and means coupling the extension piece to a stationary structural part of the machine for transmitting the opposing forces from the stationary structural part through the extension piece to the roll body, whereby the roll is supported in cantilevered manner.

2. The cantileverable roll of claim 1, wherein the roll body at the one roll end extends axially beyond the respective bearing bracket for that one end providing a point of attack there for the device for introducing an opposing force.

3. The cantileverable roll of claim 2, further comprising an insert piece for transmitting transverse force being arranged between the extension piece and the one bearing bracket.

4. The cantileverable roll of claim 2, wherein the coupling means comprises a coupling element coupling the extension piece to the stationary part of the machine.

5. The cantileverable roll of claim 4, wherein the coupling element is rigidly clamped into the stationary part of the machine.

6. The cantileverable roll of claim 5, wherein the extension piece has two portions thereof vertically spaced from each other and the coupling element passes through the extension piece at the two vertically spaced places, at both of which the coupling element engages the extension piece.

7. The cantileverable roll of claim 4, wherein the coupling element is arranged axially at a greater distance away from the bearing bracket at the one end than the point of attack for an opposing force at the one roll end.

8. The cantileverable roll of claim 1, further comprising an insert piece for transmitting transverse force being arranged between the extension piece and the one bearing bracket.

9. The cantileverable roll of claim 1, wherein the coupling means comprises a coupling element coupling the extension piece to the stationary part of the machine.

10. The cantileverable roll of claim 9, wherein the coupling element comprises a bar which is stressed in tension.

11. The cantileverable roll of claim 9, wherein the coupling element comprises a bar which is stressed in compression.

12. The cantileverable roll of claim 9, wherein the coupling element comprises a lift device for lifting the extension piece.

13. The cantileverable roll of claim 1, wherein the force opposing device is adapted for introducing a pair of opposing forces; one of the roll ends is a drive side roll end and the force opposing device is at the drive side roll end.

14. The cantileverable roll of claim 1, further comprising a frame on the machine on which the bearing brackets for the roll are supported, the frame having at least one longitudinal beam which extends through the machine generally parallel to the axis of the roll and extends beyond the bearing bracket at the one roll end for forming a structural part to which the extension piece is coupled.

15. The cantileverable roll of claim 1, wherein the extension piece includes two longitudinal arms which extend axially away from the one roll body end, are connected with the roll by being connected to the bearing bracket at the one roll body end and are respectively located at both sides of the roll body with reference to the bearing bracket which is between the longitudinal arms.

16. The cantileverable roll of claim 15, wherein the coupling means comprises a coupling element coupling the extension piece to the stationary part of the machine; and further comprising a crossbar at the extension piece located at the point of attack for an opposing force and connecting the two longitudinal arms.

17. A roll press comprising the cantileverable roll of claim 1 and a backing roll which is also rotatable, the backing roll and the cantileverable roll having respective axes which are oriented to be generally parallel for and being respectively positionable for defining a pressure nip between them;

the backing roll including means which is rotatable around the axis of the backing roll; the backing roll having opposite ends; and the machine having a respective second bearing bracket at each end of the backing roll.

18. The roll press of claim 17, wherein the first bearing bracket at each end of the cantileverable roll is coupled to the respective second bearing bracket at the respective second end of the backing roll.

19. The roll press of claim 18, wherein the cantileverable roll is positioned generally above the backing roll.

20. The roll press of claim 18, where at least one of the rolls comprises a stationary body and the rotatable means of the respective roll comprises a rotatable shell rotatable around the stationary body thereof, and a press means at the rotatable shell for pressing the shell toward the other roll.

21. The roll press of claim 20, wherein the other roll comprises a solid rotatable roll body, wherein the rotatable means of the other roll comprises the roll body which is rotatable.

22. The roll press of claim 18, wherein the other roll comprises a solid rotatable roll body, wherein the rotatable means of the other roll comprises the roll body which is rotatable.

23. The roll press of claim 18, wherein the backing roll is introducible and removable together with the respective second bearing brackets thereof generally in a direction along its axis;

an additional stand disposed beneath the backing roll and close to the second bearing bracket at the one end of the backing roll and being independent of the second bearing bracket, such that the extension piece can be supported on the additional stand.

24. The roll press of claim 23, wherein the additional stand has an opening through it, the backing roll having a drive pin at the one end thereof which extends through the opening in the additional stand.

25. The roll press of claim 23, wherein the machine has a frame and the additional stand is located on the frame.

26. The roll press of claim 18, wherein the backing roll is also developed as a cantileverable roll, and means for supporting one of the ends of the backing roll while the other of the ends is temporarily unsupported for making the backing roll a cantileverable roll.

27. The roll press of claim 26, wherein there is respective one of the extension pieces connected to the same respective end of both of the cantileverable roll and the cantileverable backing roll; the force opposing device for each roll being adapted to compensate for the weight of each of the rolls and comprising a common coupling element for the extension pieces of both of the cantileverable roll and the cantileverable backing roll.

28. The roll press of claim 26, wherein both of the cantileverable roll and the backing roll are normally supported on the frame of the machine.

29. The roll press of claim 18, wherein one of the rolls is disposed generally above the other and is an upper roll; the machine having upper frame parts above the upper roll and means fastening the respective bearing brackets of the upper roll to the upper frame parts of the machine;

means supporting the respective bearing brackets of the lower roll suspended from the bearing brackets of the upper roll.

* * * * *